Aug. 28, 1951      E. E. JURS      2,565,817

SAFETY DEVICE FOR TANK VALVE SYSTEMS

Filed Oct. 13, 1945      2 Sheets-Sheet 1

INVENTOR.
EUGENE E. JURS

BY

ATTORNEY

Aug. 28, 1951 E. E. JURS 2,565,817
SAFETY DEVICE FOR TANK VALVE SYSTEMS
Filed Oct. 13, 1945 2 Sheets-Sheet 2
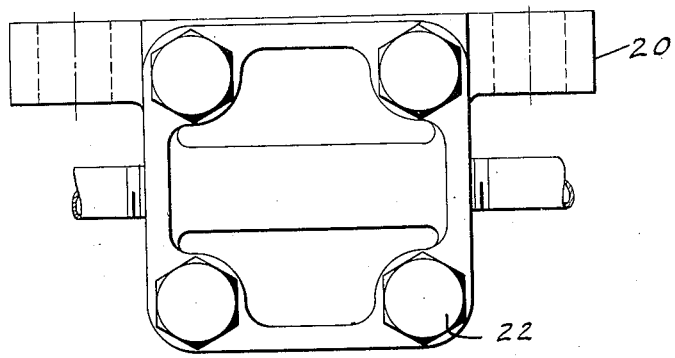
FIG. 4
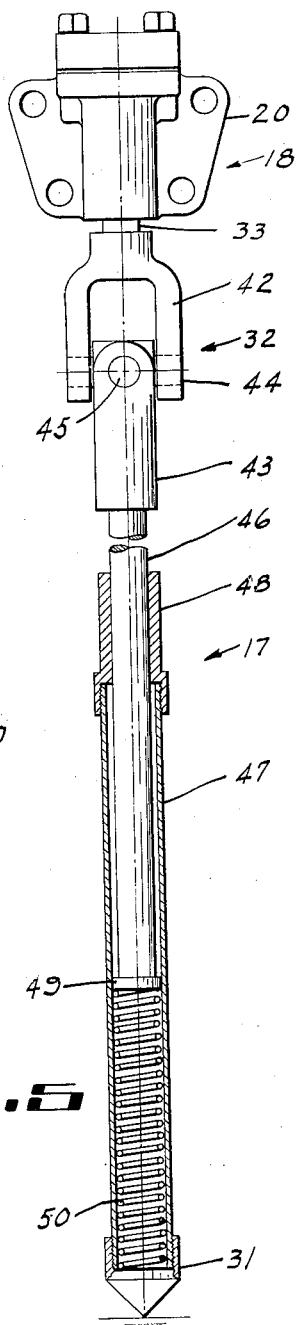
FIG. 3
FIG. 5
INVENTOR.
EUGENE E. JURS
BY
ATTORNEY Patented Aug. 28, 1951

2,565,817

UNITED STATES PATENT OFFICE 2,565,817

SAFETY DEVICE FOR TANK VALVE SYSTEMS

Eugene E. Jurs, Oakland, Calif., assignor to Shand & Jurs Company, Berkeley, Calif., a partnership Application October 13, 1945, Serial No. 622,222

7 Claims. (Cl. 137—21)

This invention relates generally to tank valve systems of the type used for controlling the discharge of liquid from tank compartments of motor trucks or the like vehicles, and particularly to safety devices for use with such valve systems.

In the past it has been common practice to equip motor truck and trailer tanks, such as are used for the delivery of gasoline, butane or like inflammable products, with tank discharge valves adapted to be controlled by the operator from the rear of the truck. One such valve system shown for example in Shand 1,960,831 makes use of a hand operated hydraulic actuator located at the rear of the truck, and connected to the various compartment valves to effect their operation hydraulically. In place of a hand operated actuator one may employ oil under pressure pump, together with a suitable hand operated control valve. In place of hydraulic pressure use has been made of pneumatic pressure or vacuum likewise controlled by a suitable hand operated valve. The purpose of such valve systems is to minimize the hazards involved in discharging volatile inflammable products from the tank compartments. One particular hazard involved is the fact that the truck may accidentally move away while the gasoline or other product is being delivered from one or more of the tank compartments. Any such movement of the truck would probably cause a breakage of the hose through which the product is being delivered, with consequent spilling of the product and attendant fire hazard.

To avoid the danger of movement of the truck while liquid is being delivered from one of the tank compartments, it has been proposed to incorporate some form of safety device which will cause automatic closure of any open tank valve when the engine of the motor truck is started in operation. I have found however that such a safety arrangement is not entirely satisfactory due to the fact that the truck may move because of failure to set the brakes on a grade, or accidental release of the brakes, without starting the engine. Furthermore such movement may be either forward or backward, or may be a side movement such as caused by skidding or upsetting of the truck.

It is an object of the present invention to provide a more effective safety device for tank truck valve systems, and particularly a safety arrangement such as will effect automatic closure of an open tank discharge valve in response to movement of the truck or trailer in any direction, irrespective of whether or not the engine is started in operation.

Another object of the invention is to provide a safety device of the type described above which will be relatively simple in construction, which is simple to use by the operator, and which is subject to visual inspection at all times whereby the operator is apprised of the fact that the safety device is either in proper condition for dispensing liquid, or is disposed for normal movement of the truck.

Further objects and features of the invention will appear from the following description in which the preferred embodiment has been set forth in detail in conjunction with the accompanying drawing.

Referring to the drawing:

Figure 3 is a side elevational view partly in section, illustrating the safety device incorporated in Figure 1.

Figure 4 is a plan view of the safety device of Fig. 3.

Fig. 5 is a side elevational view of the safety device incorporated in Fig. 1, the lower part being in section.

Figure 1:
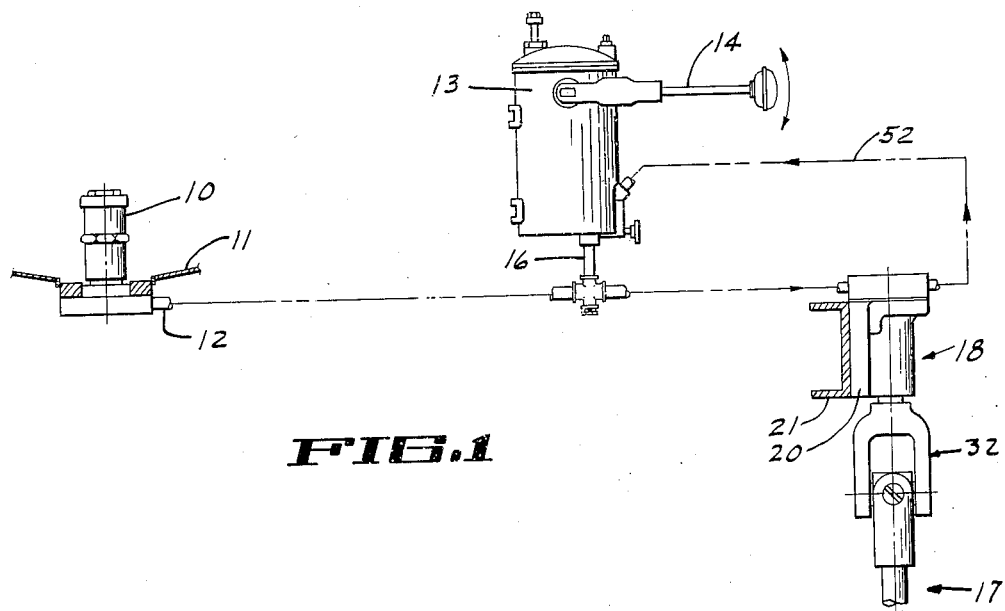
Figure 1 is a diagrammatic view illustrating schematically a tank valve system incorporating the present invention.

The tank valve system shown in Fig. 1 consists generally of one or more fluid pressure operated valve units 10, installed in the lower wall portion of a tank or tank compartment 11. Such units may for example be of the type disclosed in Shand 1,960,831 or Jurs 1,976,445. The exterior part of the valve unit is provided with a pipe connection 12 through which liquid under pressure can be applied to move the valve to open position. The valve unit is provided with a compression spring whereby when the pressure applied to line 12 is released, the valve automatically moves to closed position. At some suitable location such as the rear end of the motor truck a hydraulic actuator 13 is provided, and which can be operated by the hand lever 14. This hydraulic actuator can likewise vary as to construction but can incorporate features such as disclosed in Shand 1,960,831 or Jurs 1,976,445. Briefly such an actuator is provided with a hydraulic plunger or piston operated by the hand lever 14, and by means of which liquid like oil can be discharged under pressure through pipe line 16 to the one or more valve units being operated.

In addition to the parts described above I employ a safety device designated generally at 17, and which incorporates a special fluid valve 18. As shown particularly in Fig. 3 the valve 18 consists of a body preferably formed in two parts 19a and 19b. Body parts 19a is provided with suitable mounting pads 20 to facilitate attachment of the valve to some part of the vehicle, such as the frame part 21. The two body parts are clamped together by screws 22, and interposed between their adjacent faces there is a flexible diaphragm 23 made of suitable material such as synthetic rubber.

The upper body part 19b is ported to provide the inlet and vent passages 24 and 26. Ports or ducts 27, 28 lead from the inner ends of passages 24, 26 to the adjacent face of diaphragm 23. It will be evident that when the center portion of diaphragm 23 is permitted to flex downwardly, away from the lower end of duct 27, fluid may pass from duct 27 to duct 28 and thus out the vent passage 26. However, when the central portion of diaphragm 23 is pressed upwardly against the lower end of duct 27, such passage of fluid is prevented and pressure may be held in passage 24.

The means associated with the valve 18 for effecting its automatic operation in response to movement of the vehicle includes a road engaging foot 31 which is connected to the valve through the universal joint 32. More specifically the valve body 19a is bored to slidably receive the rod 33, which has its axis at right angles to and aligned with the center of diaphragm 23, and extending in a general vertical direction. The upper end of rod 33 has an enlarged flange or head 34 which is accommodated within the enlarged bore 36. A stem 37 is slidably fitted within a bore 38 provided in rod 33, and the upper enlarged end 39 of stem 37 is adapted to engage the underside of diaphragm 23 immediately below the duct 27. A spring 41 surrounds stem 37 and is adapted to be compressed when the rod 33 is moved upwardly. The lower end of rod 33 is attached to the fork 42 of the universal joint 32. This fork is attached to the second fork 43 of the universal joint by means of the pivot or pintel pins 44 and 45, which are right angles to each other. Fork 43 is attached to the upper end of a rod 46, which in turn extends telescopically within the tube 47. The lower end of tube 47 is attached to the foot 31. A sleeve 48 is attached to the upper end of tube 47, and serves to guide the rod 46. The lower end of rod 46 is provided with a flange or an enlarged head 49, and interposed between this head and the foot piece 31 there is a compression spring 50.

The safety device described above operates as follows: Assuming that the device is connected with a valve system in the manner shown in Fig. 1, when the tank truck or trailer tank is at rest and an operator wishes to dispense gasoline from a tank or tank compartment, the foot 31 is first swung downwardly from an out-of-the-way position (in which it is carried normally) and by compressing springs 50 and 41, it is placed in a position directly below the valve 18, that is with tube 47 and rod 46 arranged vertically. Rod 33 assumes a position somewhat raised with respect to the valve body, and the compression of spring 41 places sufficient force upon stem 37 to retain the diaphragm 23 closed with respect to duct 27. The operator now proceeds to dispense gasoline from a tank or tank compartment by operating lever 14 of the actuator to apply hydraulic pressure. Such hydraulic pressure is maintained throughout the dispensing operation insofar as the valve 18 is concerned, because this valve is retained in closed position. Assuming that the vehicle is accidentally moved, particularly either forwardly or backwardly, displacement occurs between the valve 18 and the foot 31 with the result that the rod 33 is projected to the limit of its movement by virtue of the weight of the parts connected to the same, thus causing the pressure between stem 37 and diaphragm 23 to be released, with the result that pressure of fluid in passage 24 causes venting of fluid between ducts 27, 28 and out the vent passage 26. Liquid vented in this manner may be discharged to the atmosphere but is preferably returned by line 52 to the hydraulic actuator 13. Venting of liquid as described above causes immediate closing of the valve unit 10, thus shutting off further flow of gasoline from the tank.

Figure 2:
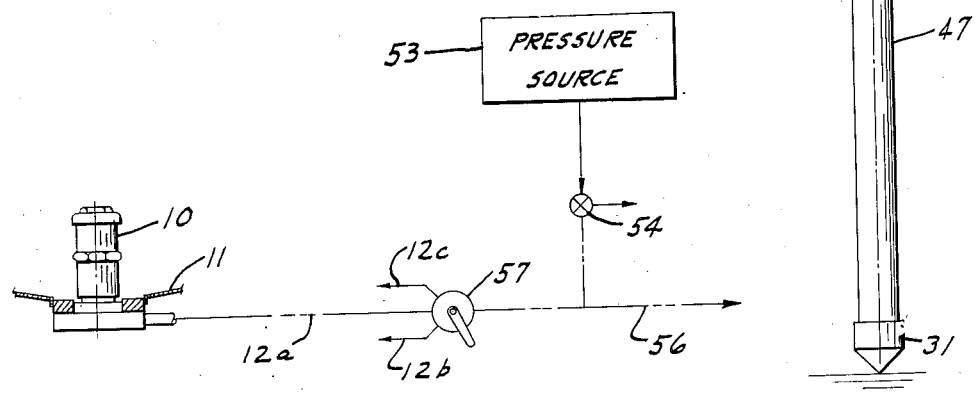
Figure 2 is a schematic view like Figure 1 but showing a tank valve system adapted to be operated from a fluid pump or like extraneous source of fluid pressure.

In addition to tank valve systems operated by hydraulic pressure, my invention is applicable to tank valve systems operated pneumatically. Also as previously mentioned actuator 13 may be omitted and any suitable source of liquid pressure employed, together with a hand controlled valve. Figure 2 represents diagrammatically a valve system in which a suitable pressure source 53, either pneumatic or hydraulic, is connected through the hand control valve 54 to the line 56 which leads to the safety valve 18, and also to the selector valve 57. The selector valve is connected to any one of a number of valve units 10, as indicated by the lines 12a, 12b and 12c. The operation of such a system is essentially the same as that described in Figure 1. Here again while the truck is stationary and the foot 31 is in position below the safety valve 18, the valve 18 is maintained closed and pressure can be applied to a valve unit for dispensing liquid. However when relative displacement occurs through movement of the vehicle there is automatic venting through valve 18, with the result that any valve units which are in open condition are caused to be automatically closed. The pressure source 53 in this instance may be an oil or air pump operated by the engine of the truck, or a pressure tank receiving gas from one of the motor cylinders.

Aside from fluid pressure operation it will be evident that my invention can be used with valve control systems in which the valve units are moved to open position by application of partial vacuum. In this instance suitable modification of the valve 18 must be made in order to insure opening of the valve to break the vacuum in the event of accidental movement of the vehicle.

My safety device has the advantage of simplicity of construction, and in addition requires a minimum of operator instruction to insure proper use. When in use the position of the device is clearly visible to the operator, and therefore there can be no doubt as to whether or not the tank system is in condition for dispensing liquid.

While my invention has been described as being particularly applicable to motor tank trucks, it will be evident that it can be applied to tank valve systems applied to other moving vehicles or tank supporting structures, such as tank cars.

I claim:

1. In a fluid pressure operated tank valve system for motor trucks and trailers or like vehicles wherein a source of fluid pressure is applied to operate a tank discharge valve between open and closed positions, a safety device comprising a valve carried by the vehicle and having inlet and outlet passages, the inlet passage being adapted for connection with the fluid pressure line leading to the tank valve, a manually positioned member adapted to rest upon the ground when the vehicle is at rest and means connecting said member to said valve for causing the valve to be opened responsive to movement of the vehicle relative to the ground and said member.

2. In fluid pressure operated tank valve systems for motor trucks and trailers or like vehicles wherein a source of fluid pressure is applied to operate a tank discharge valve between open and closed positions, a safety device comprising a valve having inlet and vent passages, the inlet passage being adapted for connection with the fluid pressure line leading to the valve, a manually positioned foot member adapted to engage the ground when the vehicle is at rest, and means forming a connection between the valve and the foot to retain said valve closed when the vehicle is at rest and to cause the valve to open and vent fluid from the tank discharge valve and effect opening of the same when the vehicle moves relative to the ground and said member.

3. In a fluid pressure operated tank valve system for motor trucks and trailers or like vehicles wherein a source of fluid pressure is applied through a fluid line to operate a tank discharge valve between open and closed positions, a safety device comprising a valve having inlet and vent passages, the inlet passage being adapted for connection with the fluid pressure line leading to the valve, a foot adapted to engage the ground when the vehicle is at rest, articulated extensible means forming a connection between the foot and said valve, and spring means associated with said extensible means and serving to apply force to said valve to retain the same closed when the extensible means is generally upright, the foot is normally engaged with the ground, and the vehicle is at rest, said extensible means permitting automatic opening of said valve in responsive to movement of the vehicle relative to the ground.

4. In a fluid pressure operated tank valve system for motor trucks, trailers, or like vehicles wherein a source of fluid pressure is applied through a fluid line to operate a tank discharge valve between open and closed positions, a safety device comprising a valve having inlet and vent passages, the inlet passage being adapted for connection with the fluid pressure line leading to the valve, said valve including an operating member movable to closed position to close the inlet and to open position to connect the inlet to the vent passage, a foot adapted to engage the ground at a point beneath said operating member when the vehicle is at rest, articulated extensible means forming a connection between the foot and said valve operating member, and spring means associated with said extensible means and serving to apply force to said valve member to retain the same in closed position when the foot is normally engaged with the ground, the extensible means in generally upright position and the vehicle is at rest, said extensible means permitting automatic opening movement of said valve member in response to movement of the vehicle in a direction to move the location of the foot relative to the valve operating member.

5. In a fluid pressure operated tank valve system for motor trucks, trailers or like vehicles wherein a source of fluid pressure is applied through a fluid line to operate a tank discharge valve between open and closed positions, a safety device comprising a valve having inlet and vent passages, the inlet passage being adapted for connection with the fluid pressure line leading to the valve, said valve including an operating member movable to closed position to close the inlet and to open position to connect the inlet to the vent passage, a foot adapted to engage the ground at a point beneath the operating member when the vehicle is at rest, means including a universal joint forming a connection between the foot and said valve operating member, and spring means associated with said connecting means to apply force to said valve to retain the same closed when the foot is normally engaged with the ground at a point beneath said valve operating member and the vehicle is at rest, said connecting means permitting automatic opening of said valve in response to movement of the vehicle relative to the ground with concurrent displacement of the valve and its operating member relative to the foot.

6. In a fluid pressure operated tank valve system for motor trucks and trailers or like vehicles wherein a source of fluid pressure is applied to operate a tank discharge valve between open and closed positions, a safety device comprising a valve carried by the vehicle and having inlet and outlet passages, the inlet passage being adapted for connection with the fluid pressure line leading to the tank valve, and means for retaining said valve closed when the vehicle is normally at rest and for effecting automatic opening of the valve when the vehicle moves relative to the ground, said means including a manually positioned foot adapted to engage and rest upon the ground, and means connecting the foot and the valve and operative to normally retain said valve closed and to effect opening of the valve in response to horizontal displacement of the vehicle and the valve relative to the ground and said foot.

7. In fluid pressure operated tank valve systems for motor trucks and trailers or like vehicles wherein a source of fluid pressure is applied to operate a tank discharge valve between open and closed positions, a safety device comprising a valve having inlet and vent passages, the inlet passage being adapted for connection with the fluid pressure line leading to the valve, a manually positioned foot member adapted to engage and rest upon the ground when the vehicle is at rest and the tank valve system is in operation, and means forming an operative connection between the valve and the foot whereby when the vehicle is normally at rest said valve is retained closed and whereby when the vehicle is caused to move relative to the ground and said foot said valve is caused to automatically vent fluid from the tank discharge valve and thus cause automatic closing of the same, said last means comprising connecting means between the foot and the valve including members extending generally upright from the foot when the vehicle is normally at rest, said connecting means serving to effect opening of the valve when the vehicle is accidentally moved to displace said valve in a horizontal direction relative to the foot.

EUGENE E. JURS.

REFERENCES CITED

The following references are of record in the file of this patent:

UNITED STATES PATENTS

| Number | Name | Date |
| --- | --- | --- |
| Re. 20,863 | Holby | Sept. 20, 1938 |
| 1,801,749 | McEachern | Apr. 21, 1931 |
| 2,090,931 | Crista | Aug. 24, 1937 |